No. 675,139. Patented May 28, 1901.
W. & J. REUTHER.
POTATO DIGGER.
(Application filed Sept. 29, 1900.)
(No Model.) 3 Sheets—Sheet 2.
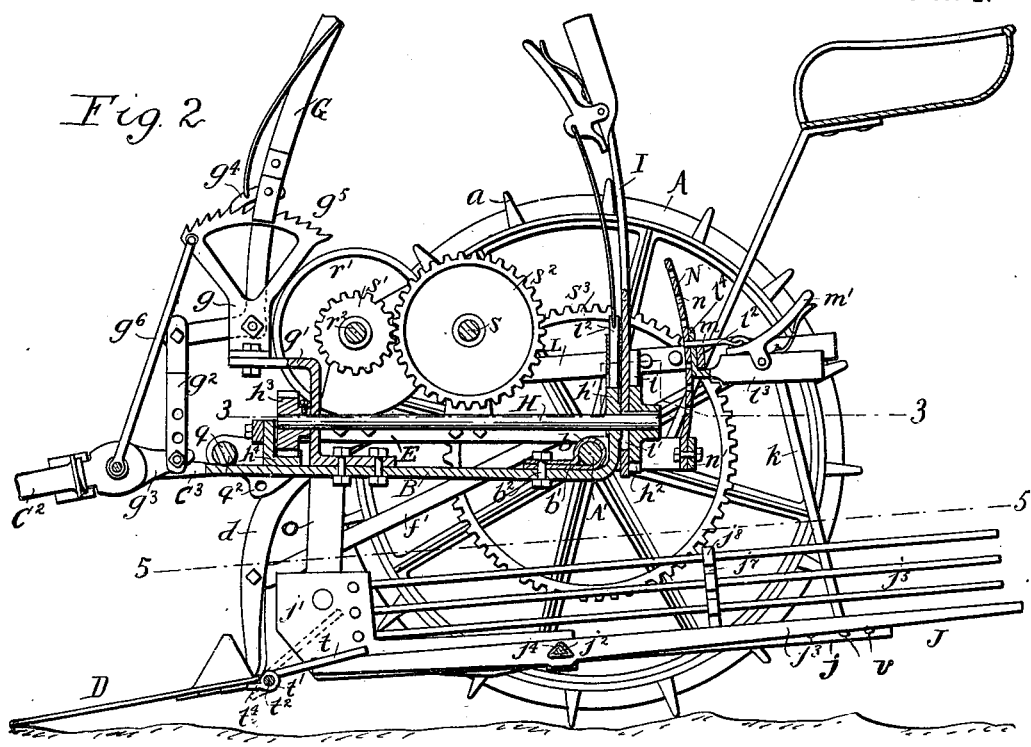
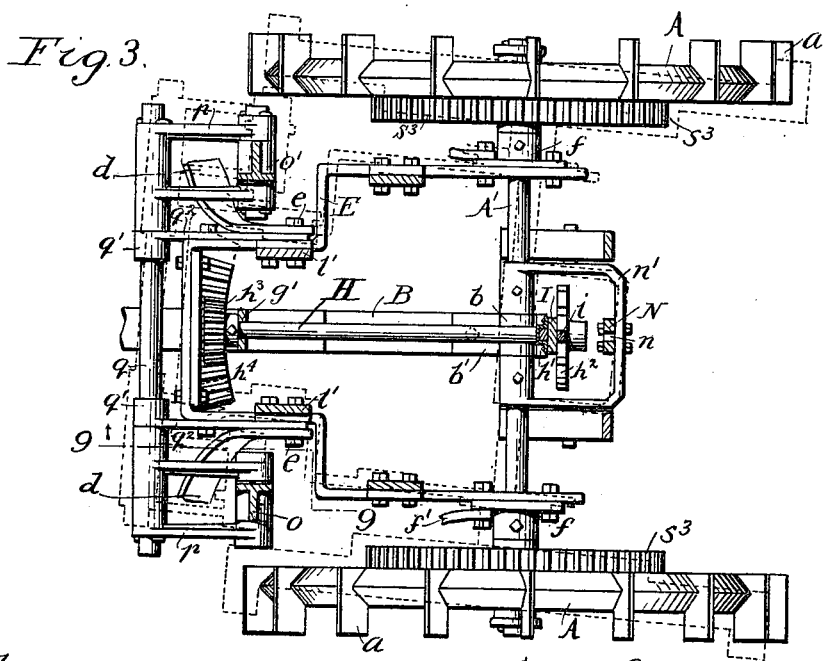
Witnesses:
E. A. Volk.
F. F. Scherzinger.
William Reuther
John Reuther
By Wilhelm Bonner
Inventors
Attorneys

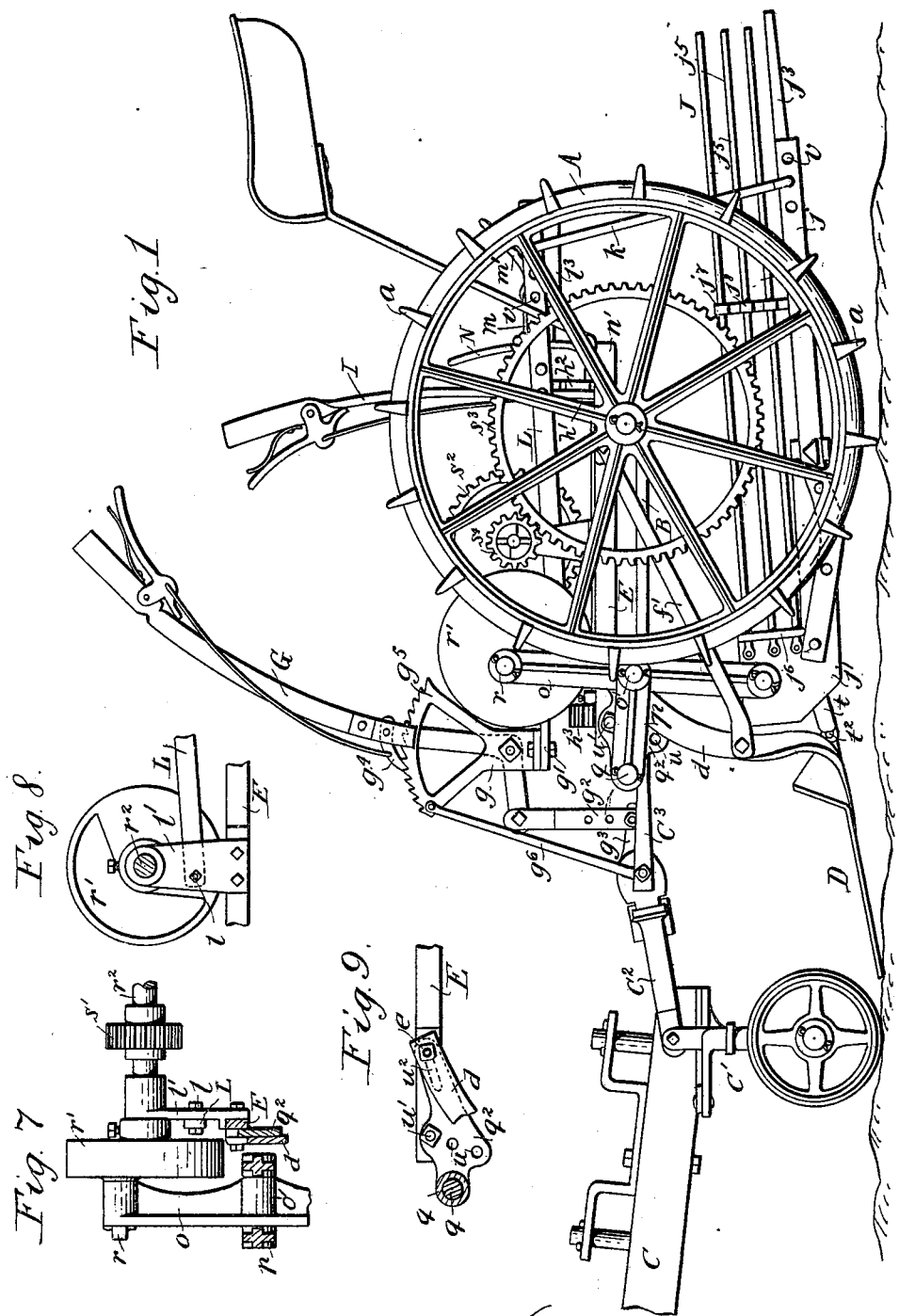

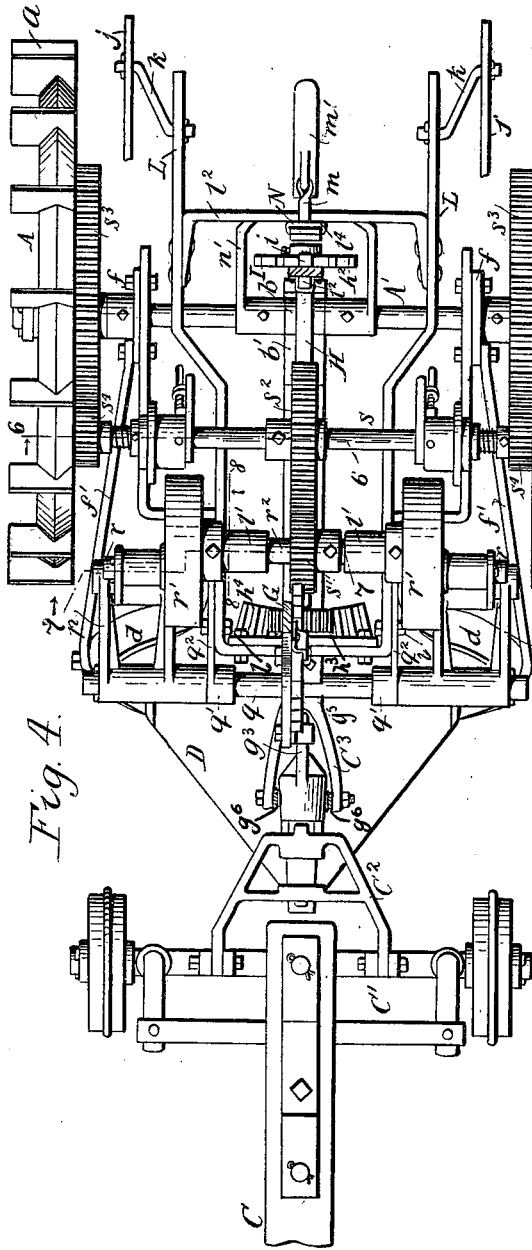

UNITED STATES PATENT OFFICE.

WILLIAM REUTHER AND JOHN REUTHER, OF ELMA, NEW YORK.

POTATO-DIGGER.

SPECIFICATION forming part of Letters Patent No. 675,139, dated May 28, 1901.

Application filed September 29, 1900. Serial No. 31,528. (No model.)

*To all whom it may concern:*

Be it known that we, WILLIAM REUTHER and JOHN REUTHER, citizens of the United States, and residents of Elma, in the county of Erie and State of New York, have invented a new and useful Improvement in Potato-Diggers, of which the following is a specification.

This invention relates more particularly to that class of potato-diggers which comprise a plow or scoop which digs into the hill and loosens and elevates the earth and potatoes and a shaking-separator which receives the earth and potatoes from the scoop and agitates the material, so as to sift the earth through the spaces between the tines of the separator, while the potatoes are discharged over the rear end of the separator.

The object of our invention is to provide the separator with simple actuating devices which impart a tossing motion to the same for effectually detaching the earth from the potatoes and which permit the stroke of the separator to be varied as may be required by the condition of the soil.

In the accompanying drawings, consisting of three sheets, Figure 1 is a side elevation of our improved potato-digger. Fig. 2 is a vertical longitudinal section thereof. Fig. 3 is a horizontal section of the machine in line 3 3, Fig. 2. Fig. 4 is a top plan view of the machine, partly in section, the greater portion of the separator being omitted for the sake of clearness. Fig. 5 is a horizontal section in line 5 5, Fig. 2. Figs. 6 and 7 are transverse vertical sections in lines 6 6 and 7 7, Fig. 4, respectively. Fig. 8 is a fragmentary longitudinal section in line 8 8, Fig. 4. Fig. 9 is a vertical longitudinal section in line 9 9, Fig. 3.

Like letters of reference refer to like parts in the several figures.

A represents the ground-wheels, which turn on the ends of the axle A' and which may be of any ordinary construction. Their rims are preferably V-shaped in cross-section and provided with transverse lugs or wings $a$, as shown.

B is a longitudinal draft bar or frame having its rear portion connected with the axle A' by a strap or clip $b$, which embraces the central portion of the axle. This clip has forwardly-extending branches $b'$, which are pivotally connected to the draft-bar by a vertical bolt $b^2$, as shown in Fig. 2, by which connection the axle is capable of swiveling to a limited extent on the draft-bar.

C is the tongue or pole, supported at its rear end upon a truck C', of any suitable or well-known construction. As shown in Figs. 1 and 4, this truck is connected with the draft-bar B by an intermediate frame $C^2$, which is pivoted at its front end to the truck and at its rear end to the bifurcated front end $C^3$ of the draft-bar.

D is the plow or scoop of the machine, which is carried by depending arms $d$, secured at their upper ends to a horizontal frame E by transverse bolts $e$, as shown in Figs. 3 and 9. This frame is approximately U-shaped, and its front portion, from which the scoop is suspended, is contracted and rests loosely upon the draft-bar B, while its side bars are rigidly secured at their rear ends to flanged collars $f$, which in turn are fastened to the axle, as shown in Figs. 3, 4, and 6.

$f'$ represents forwardly-inclined braces, secured at their rear ends to the flanges of the collars $f$ and at their front ends to the scoop-arms $d$.

G is an upright hand-lever for regulating the depth to which the scoop enters the ground and for raising the same clear of the ground in going to and coming from a field. This lever is pivoted by a horizontal bolt to a standard $g$, which is mounted on a bracket $g'$, secured to the draft-bar B, and has its lower arm connected by a link $g^2$ with an arm $g^3$, extending rearwardly from the connecting-frame $C^2$. The lever G is locked in any desired position by a catch $g^4$, pivoted thereto and engaging with a toothed segment $g^5$, arranged on the lever-standard $g$. $g^6$ is an inclined brace which connects the segment $g^5$ with the front end of the draft-bar B. Upon swinging this lever rearwardly the draft-bar is raised, and as the frame E, which carries the scoop, rests on this bar the scoop is lifted therewith.

H is a longitudinal shaft arranged above the draft-bar and journaled near its ends in openings or bearings formed in the bracket $g'$ and the upwardly-turned rear end $h'$ of the draft-bar, as shown in Figs. 2 and 3. This shaft is provided at its rear end with a notched or toothed actuating-wheel $h^2$ and at its front end with a gear-wheel $h^3$, which meshes with a curved gear-rack $h^4$, rigidly secured to the front cross-bar of the frame E, so that upon turning said shaft in one or the other direction the front portion of said frame is shifted laterally at an angle to the draft-bar, thereby causing the axle to swivel on the pivot $b^2$ and turning the ground-wheels at an angle to the line of draft, as shown by dotted lines in Fig. 3. The shaft H is turned by a laterally-swinging hand-lever I, pivoted on said shaft between the notched wheel $h^2$ and the upturned rear end $h'$ of the draft-bar B, and is provided with a fixed actuating pawl or lug $i$, which is adapted to engage successively with the notches of the wheel $h^2$. The lever I is provided with a vertical slot $i'$, through which the shaft H passes and which permits the lever to be slid downwardly for engaging its pawl $i$ with a notch of the actuating-wheel $h^2$ during the forward stroke of the lever and to be slid upwardly for disengaging its pawl from the said wheel during the return stroke of the lever.

$i^2$ is a vertically-sliding locking-dog guided on the hand-lever I and engaging with a notch $i^3$ formed in the upturned rear end $h'$ of the draft-bar B, whereby said shaft is locked against turning after adjusting the ground-wheels at the desired angle to the line of draft. By this provision the ground-wheels can be turned at more or less of an angle to the line of draft in digging potatoes on a side-hill, so that the wheels tend to run up the hill and counteract the tendency of the machine to slide down the hill.

J is the shaker or separator, arranged lengthwise of the machine in rear of the scoop. The frame of the separator consists of side bars $j$, provided at their front ends with upward extensions $j'$ and a cross-bar $j^2$, preferably of triangular cross-section, which is rigidly secured at its ends to the central portion of said side bars.

$j^3$ represents longitudinal bars or tines, preferably of sheet metal, set on edge, which tines form the bottom of the separator and which are mounted side by side upon the triangular cross-bar $j^2$, which latter passes through correspondingly-shaped holes formed in said bars. These bars are separated by space-blocks $j^4$, mounted upon the cross-bar $j^2$.

The separator is provided with open side walls formed of longitudinal rods or wires $j^5$, arranged one above another and secured at their front ends to the side-bar extensions $j'$ and passing through upright perforated lugs or flanges $j^6$, arranged on the outer side of said extensions near the front ends of said rods, as shown in Figs. 1 and 5. The rear portions of these rods are supported in standards $j^7$, secured to the side bars $j$ and having eyes or perforated enlargements $j^8$, through which the rods pass.

The rear portion of the separator is suspended by links $k$ from a vertically-adjustable frame L, supported above the axle. This frame consists of vertically-swinging side bars having their front ends pivoted by transverse bolts $l$ to standards $l'$, secured to the lower frame E, as shown in Figs. 7 and 8. These side bars are connected together by a cross-bar $l^2$, carrying a rigid rearwardly-extending handle $l^3$, by which the rear portion of the frame L is raised or lowered for changing the inclination of the separator. This frame is held at any desired elevation by a longitudinal sliding bolt $m$, which is guided in an opening formed in an upward extension $l^4$ at the inner end of the handle $l^3$ and which is adapted to enter one of a vertical series of holes $n$, formed in a curved standard N. The latter is secured to a horizontal frame $n'$, rigidly secured to the axle A and extending rearwardly therefrom, as shown in Figs. 2, 3, and 4. The sliding bolt $m$ is operated by a lever $m'$, pivoted to the handle $l^3$.

The front portion of the separator is suspended from the lower arms of upright rock-levers $o$, which are pivoted at $o'$ to the inner ends of vertically-swinging links $p$. These links are pivoted at their front ends upon a transverse rod or shaft $q$, which is supported in bearings $q'$, carried by brackets $q^2$, which are preferably adjustably secured to the front portion of the lower frame E. The upper ends of the rock-levers $o$ are pivoted to the wrist-pins $r$ of upright crank-disks $r'$, which are secured to opposite ends of a transverse shaft $r^2$. This shaft is journaled in the standards $l'$, as shown in Figs. 4 and 7, and is driven from a counter-shaft $s$ by intermeshing gear-wheels $s'$ $s^2$, secured to said shaft, as shown in Figs. 2 and 4. This counter-shaft is in turn driven from the ground-wheels by gear rims or wheels $s^3$, secured to the inner sides of said wheels and meshing with pinions $s^4$, secured to said counter-shaft, as shown in Figs. 1 and 4. The actuating mechanism of the separator is thrown into or out of gear with the ground-wheels by clutches $s^5$, of any suitable construction.

$t$ represents tines or fingers which extend rearwardly from the rear end of the scoop and which project into the spaces between the separator bars or tines $j^3$, so as to bridge the space between the front ends of said bars and the scoop. These fingers are free to yield upwardly in case a stone enters between the teeth and the tines of the separator, thereby preventing stopping of the machine or breakage of the teeth. For this purpose each of said fingers is provided with a hub $t'$, which loosely surrounds a transverse supporting-rod $t^2$, which is secured to the rear end of the scoop by brackets $t^3$, as shown by dotted lines in Fig. 5. In order to prevent the fingers from falling below their normal position, the hub of each finger is provided with a forwardly-projecting lug or stop $t^4$, which bears against the under side of the scoop, as shown in Fig. 2. The fingers remain in their depressed position by gravity and the pressure of the material passing over the same.

The operation of our improved machine is as follows: The scoop D is lowered to the desired depth by means of the hand-lever G, and if the machine is to be used on level ground the laterally-swinging frame E is adjusted by the hand-lever I to its central position, so that the ground-wheels are parallel with the line of draft, as shown by full lines in Figs. 3 and 4. The forward rotation of the ground-wheels is imparted to the crank-disks $r'$ through the intermediate gearing, hereinbefore described, and these disks rock the levers $o$ on their pivots and at the same time cause the same to rise and fall. The rocking motion of the levers produces a longitudinal vibration of the separator, while their vertical motion imparts to the front portion of the separator a rising-and-falling motion. This results in a compound or tossing motion, which tends to throw the earth and potatoes deposited on the separator upwardly and rearwardly, thus effectually agitating and breaking up the lumps of earth and thoroughly separating them from the potatoes. When the soil is comparatively moist or wet, a more vigorous agitation of the separator is necessary to separate the earth from the potatoes than when the soil is comparatively dry. In order to permit the stroke of the separator to be increased or diminished, according to the requirements of the soil, the brackets $q^2$, which carry the supporting-shaft $q$ of the links $p$, are made adjustable upwardly and rearwardly on the main frame E. For this purpose each bracket is provided adjacent to the shaft $q$ with an inclined series of holes $u$, through one of which passes a removable clamping-bolt $u'$, and in its rear portion with a longitudinal slot $u^2$, through which the clamping-bolt $e$ passes, as shown in Fig. 9. Upon adjusting the brackets $q^2$ to their lowest position, in which the front bolts $u'$ pass through the uppermost holes of the brackets, as shown in Fig. 9, the separator receives a comparatively short stroke, which renders it suitable for operating upon comparatively dry soil. When the brackets are adjusted to their highest position, in which the front bolts $u'$ pass through their lowermost holes, the separator receives its longest stroke, adapting it to wet soil, while when the brackets are adjusted to an intermediate position the separator receives a stroke of medium length, which adapts it to soil containing a medium degree of moisture.

By adjusting the rear links $k$ of the separator at a greater or less angle the rear end of the separator receives more or less of an upward throw. These links may be made adjustable by providing the side bars of the separator and of the auxiliary frame L with a longitudinal series of holes $v$ for receiving the end pivots of said links, as shown in Figs. 1 and 2.

When the machine is used on the side of a hill, the ground-wheels are adjusted at a greater or less angle to the line of draft by means of the hand-lever I, as hereinbefore described.

The rear end of the separator can be raised or lowered for giving the same the desired pitch by raising or lowering the rear end of the auxiliary frame L on the standard N in the manner hereinbefore described.

We claim as our invention—

1. The combination with the frame of the machine, the axle and the ground-wheels mounted thereon, of a vibrating separator having its rear portion suspended from the frame of the machine, a crank-disk which is geared with one of the ground-wheels, a rock-lever pivoted at its upper end to said crank-disk and at its lower end to the front portion of the separator, and a vertically-movable support on which the said rock-lever is fulcrumed, substantially as set forth.

2. The combination with the frame of the machine, the axle and the ground-wheels mounted thereon, of a vibrating separator having its rear portion suspended from the frame of the machine, a crank-disk which is geared with one of the ground-wheels, a vertically-swinging link pivoted at one end to the frame, and a rock-lever fulcrumed between its ends on the free end of said link and pivoted at its upper end to said crank-disk and at its lower end to the front portion of the separator, substantially as set forth.

3. The combination with the frame of the machine, the axle and the ground-wheels mounted thereon, of a separator vibrating lengthwise of the machine and having its rear portion suspended from the frame of the machine, a transverse shaft geared with one of said ground-wheels and having a crank-disk, a vertically-swinging link mounted on a pivot which is adjustable lengthwise of the machine, and a rock-lever fulcrumed on the free end of said link and pivoted at its upper end to said crank-disk and at its lower end to the front portion of the separator, substantially as set forth.

4. The combination with the frame of the machine, the axle and the ground-wheels mounted thereon, of a separator vibrating lengthwise of the machine and having its rear portion suspended from the frame of the machine, a transverse shaft geared with one of said ground-wheels and having a crank-disk, a bracket capable of upward and rearward adjustment on the frame, a vertically-swinging link pivoted to said bracket, and a rock-lever fulcrumed on the free end of said link and pivoted at its upper end to said crank-disk and at its lower end to the front portion of the separator, substantially as set forth.

5. The combination with the frame of the machine, the axle and the ground-wheels mounted thereon, of a separator vibrating lengthwise of the machine and having its rear portion suspended from the frame of the machine, a transverse shaft geared with one of said ground-wheels and having crank-disks, adjustable brackets secured to the front portion of the frame and each provided with an inclined series of holes through one of which passes a fastening-bolt, a transverse shaft supported in said brackets, vertically-swinging links pivoted at their front ends on said shaft, and rock-levers fulcrumed on the rear ends of said links and pivoted at their upper ends to said crank-disks and at their lower ends to the front portion of the separator, substantially as set forth.

6. The combination with the main frame of the machine, and a longitudinally-vibrating separator, of a vertically-adjustable frame pivoted at its front end to said main frame, and links connecting the rear portion of the separator with the rear portion of said adjustable frame, substantially as set forth.

7. The combination with the main frame of the machine, and a longitudinally-vibrating separator, of a vertically-adjustable frame pivoted at its front end to said main frame, links connecting the rear portion of the separator with the rear portion of said adjustable frame, a standard mounted on the rear portion of the main frame and provided with a vertical row of holes, and a locking-bolt mounted on the rear portion of said adjustable frame and adapted to engage in one of the holes of said standard, substantially as set forth.

8. In a potato-digger, a separator consisting of longitudinal side bars, a cross-bar connecting said side bars, and separated longitudinal tines forming the bottom of the separator and each having an opening through which said cross-bar passes, substantially as set forth.

9. In a potato-digger, a separator having longitudinal side bars provided near their rear ends with perforated standards and at their front ends with upward extensions each provided with upright perforated ears, and side rods arranged above said side bars and secured at their front ends to the upward extensions of said side bars and passing through said perforated ears and standards, substantially as set forth.

Witness our hands this 27th day of September, 1900.

WILLIAM REUTHER.
JOHN REUTHER.

Witnesses:
CARL F. GEYER,
JNO. J. BONNER.